US007949063B2

(12) United States Patent
Jonsson et al.

(10) Patent No.: US 7,949,063 B2
(45) Date of Patent: May 24, 2011

(54) METHOD AND APPARATUS FOR IMPAIRMENT CORRELATION ESTIMATION IN MIMO SYSTEMS

(75) Inventors: Elias Jonsson, Malmö (SE); Andres Reial, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1030 days.

(21) Appl. No.: 11/679,541

(22) Filed: Feb. 27, 2007

(65) Prior Publication Data

US 2008/0205562 A1    Aug. 28, 2008

(51) Int. Cl.
*H04B 7/02* (2006.01)
*H04L 1/02* (2006.01)

(52) U.S. Cl. ......... 375/267; 375/260; 375/347; 375/349

(58) Field of Classification Search .................. 375/267, 375/346–350, 260
See application file for complete search history.

(56) References Cited

U.S. PATENT DOCUMENTS

| 6,907,270 | B1 | 6/2005 | Blanz | |
|---|---|---|---|---|
| 2006/0007990 | A1* | 1/2006 | Cozzo et al. | 375/148 |
| 2006/0251156 | A1* | 11/2006 | Grant et al. | 375/148 |
| 2008/0095279 | A1* | 4/2008 | Reial et al. | 375/343 |

OTHER PUBLICATIONS

Chizhik, Dmitry et al. "Multiple-Input-Multiple-Output Measurements and Modeling in Manhattan." IEEE Journal on Selected Areas in Communications, vol. 21, No. 3, Apr. 2003, pp. 321-331.
Jeremic, Aleksandar et al. "OFDM Channel Estimation in the Presence of Interference." IEEE Transactions on Signal Processing, vol. 52, No. 12, Dec. 2004, pp. 3429-3439.
Nicoli, Monica et al. "Multislot Estimation of Fast-Varying Space-Time Communication Channels." IEEE Transactions on Signal Processing, vol. 51, No. 5, May 2003, pp. 1184-1195.
Sieskul, Bamrung Tau et al. "On Parameter Estimation of Ricean Fading MIMO Channel: Correlated Signals and Spatial Scattering." 2005 IEEE 16th International Symposium on Personal, Indoor and Mobile Communications, vol. 1, Sep. 11-14, 2005, pp. 522-526.
Stridh, Rickard et al. "MIMO Channel Capacity and Modeling Issues on a Measured Indoor Radio Channel at 5.8 GHz." IEEE Transactions on Wireless Communications, vol. 4, No. 3, May 2005, pp. 895-903.
Yu, Kai et al. "Modeling of Wide-Band MIMO Radio Channels Based on NLoS Indoor Measurements." IEEE Transactions on Vehicular Technology, vol. 53, No. 3, May 2004, pp. 655-665.

\* cited by examiner

*Primary Examiner* — Curtis B Odom
(74) *Attorney, Agent, or Firm* — Coats & Bennett, P.L.L.C.

(57) ABSTRACT

The teachings herein disclose methods and apparatus that simplify impairment correlation estimation for received signal processing, based on determining, for any given processing interval, which impairment contributors should be considered in the estimation of overall received signal impairment correlations. These simplifications reduce computational processing requirements, allowing reduced circuit complexity and/or reduced operating power, and improve receiver performance. A corresponding transmitter and transmission method include transmitting multiple information streams to targeted receivers according to ongoing scheduling, and controlling the ongoing scheduling to reduce the number of impairment contributors considered in impairment correlation estimation at the targeted receivers. In one embodiment, a receiver identifies which impairment contributors to consider based on receiving control information. In another embodiment, the receiver identifies the impairment contributors to consider based on background processing, e.g., background determination of parametric model fitting parameters for a plurality of impairment contributors, and observing those model fitting parameters over time.

45 Claims, 3 Drawing Sheets

METHOD AND APPARATUS FOR IMPAIRMENT CORRELATION ESTIMATION IN MIMO SYSTEMS

BACKGROUND

1. Field of the Invention

The present invention generally relates to multiple-input-multiple-output (MIMO) communication systems, and particularly relates to estimating signal impairment correlations in such systems.

2. Background

Generalized Rake (G-Rake) receivers, chip equalization receivers, and other types of interference-suppressing receivers estimate received signal impairment correlations as a basis for whitening colored interference. For example, a "parametric" G-Rake receiver models received signal impairment correlations using a number of model terms. More particularly, the parametric G-Rake receiver expresses different signal impairment correlations using corresponding covariance matrices, e.g., a covariance matrix modeling same-cell interference, a covariance matrix modeling other-cell interference, etc. Each matrix appears as a term in an overall impairment correlation model and, in general, each term includes a scaling factor, also referred to as a "fitting" parameter.

In operation, the parametric G-Rake directly estimates received signal impairment correlations from its observation of Common Pilot Channel (CPICH) samples, for example. The modeled impairment correlations are then "fitted" to the directly observed impairments, based on a least squares or other fitting process that adjusts the fitting parameter of each term in the impairment correlation model. The fitting process works relatively well despite the potentially noisy direct estimates of signal impairment correlations taken from the CPICH samples, because there are relatively few terms in the impairment correlation model, and therefore relatively few fitting parameters to be determined during the fitting process.

In contrast, in Multiple-Input-Multiple-Output (MIMO) systems, a potentially much larger number of fitting parameters must be determined from these same direct estimates, because of the more complicated impairment correlation models attendant with operation in MIMO systems. Extending the "standard" parametric G-Rake process of determining fitting parameters therefore suffers because of the larger number of model terms to account for in MIMO contexts, such as in the Dual Transmit Antenna Array (D-TxAA) MIMO context of Release 7 of the Wideband CDMA (WCDMA) standards.

Moreover, MIMO contexts brings with them particular forms of signal impairment that differ between the data and pilot signals, complicating use of pilot-based impairment correlation estimations in the impairment model fitting process. For example, data signals in MIMO systems may suffer from cross-stream interference arising from the reuse of channelization parameters (e.g., channel code or channel frequency) for different information streams at the MIMO transmitter. Such interference generally does not arise on pilot signals because they are transmitted across MIMO antennas using unique channelization parameters, and the pilot-based direct observations of received signal impairment correlations therefore do not reflect the cross-stream interference component of data signal impairment correlations. The use of like pre-coding weights, e.g., beam forming weights in D-TxAA MIMO, for different information streams further complicates the parametric modeling of impairment correlation estimation.

In short, the parametric modeling approach to impairment correlation estimation and compensation, such as used in G-Rake, chip equalizer, and other interference-suppressing receiver architectures, becomes problematic in MIMO systems. Even assuming that pilot-based observations provide a basis for determining impairment correlations in a received communication signal, the number of impairment contributors that are potentially significant is so large that model fitting becomes computationally burdensome and the fitting results become correspondingly less accurate as the number of model terms simultaneously fitted to measured impairment correlations increases.

SUMMARY

Received signal processing, such as interference suppression and/or received signal quality estimation, becomes more complex with the increasing complexity of transmit signal structures and transmission systems. For example, Multiple-Input-Multiple-Output (MIMO) systems involve a potentially large number of received signal impairment contributors, corresponding to a variety of interference sources. Accordingly, the teachings herein disclose methods and apparatus that simplify impairment correlation estimation for received signal processing, based on determining, for any given processing interval, which impairment contributors should be considered in the estimation of overall received signal impairment correlations. These simplifications reduce computational processing requirements, thereby allowing reduced circuit complexity and/or reduced operating power, as well as improving fitting parameter estimation quality, thereby also improving receiver performance.

Broadly, one or more embodiments of receiver-based processing as taught herein improve impairment correlation estimation, and thereby improve receiver performance and efficiency, by dynamically identifying which model fitting parameters and/or groups of model fitting parameters to consider in a generalized model of impairment contributions that may account for a potentially large number of impairment terms. Receiver processing includes, in one or more embodiments, detecting and excluding negligible interference components from the model fitting process, and may further include detecting repetitive (or like-valued) model fitting parameters for purposes of grouping them together in a simplified estimation process. Notably, one or more embodiments of receiver processing as taught herein use inferred or received knowledge of transmission signal structures to make specific simplifications in impairment correlation estimation.

In one embodiment, a method of estimating impairment correlations in a receiver comprises representing a plurality of impairment contributors in a generalized expression for impairment correlations. The method continues with dynamically identifying which impairment contributors in the generalized expression to consider in estimating impairment correlations for a received communication signal. The method further includes estimating impairment correlations for the received communication signal based on the identified impairment contributors. The method may be carried out by, for example, a MIMO receiver operating in a MIMO communication system, wherein the receiver includes an appropriately configured receiver circuit.

With dynamic identification, the receiver adjusts the simplifications it makes to its generalized expression for impairment correlations over time, based on changing impairment conditions. Such adjustments are, in one or more embodiments, based on receiving control information that directly or indirectly indicates which impairment contributors should be considered by the receiver in estimating overall impairment correlations for one or more received communication signals of interest.

In one or more other embodiments, the adjustments are based on impairment correlation measurements made at the receiver. For example, in at least one embodiment, the generalized expression comprises a parametric model of impairment correlations, having a plurality of model fitting parameters corresponding to a plurality of impairment contributors. In these embodiments, one or more processing circuits within an included receiver circuit use measured impairment correlations to determine individual ones (or related subgroups) of the model fitting parameters over time. In at least one such embodiment, the receiver measures signal impairment correlations, e.g., from a received pilot signal, over one or more background processing intervals, and calculates values for the model fitting parameters over those one or more background processing intervals based on fitting simplified versions of the parametric model to the measured impairment correlations.

The receiver observes the relative or absolute values of the model fitting parameters calculated during this background processing to identify non-negligible ones of the impairment contributors. Thus, in any given foreground processing interval, such as the intervals in which the receiver generates combining weights for interference suppression and/or received signal quality estimation, the receiver estimates overall impairment correlations for the received signal based on the impairment contributors identified as non-negligible and using a minimum set of distinct fitting parameters. For example, the receiver fits the impairment model terms corresponding to the non-negligible impairment contributors to currently measured impairment correlations, which may be obtained, for example, from a pilot signal received in conjunction with the received communication signal. Foreground impairment correlation estimation is thus simplified by reducing the number of model fitting parameters involved in the foreground parametric impairment correlation estimation.

Correspondingly, a method of transmitting communication signals to a plurality of targeted receivers comprises transmitting one or more information streams for individual ones of the targeted receivers according to ongoing transmission scheduling, and controlling the ongoing transmission scheduling to reduce the number of impairment contributors that must be considered in received signal processing by scheduled ones of the targeted receivers. In one such embodiment, an appropriately configured transmitter reduces the number of impairment contributors that must be considered in received signal processing by scheduled ones of the targeted receivers based on restricting the number of simultaneous transmit pre-coding weights used to transmit different information streams to fewer than the defined number of transmit pre-coding weights. In another embodiment, the transmitter reduces the number of impairment contributors that must be considered in received signal processing by scheduled ones of the targeted receivers based on scheduling the targeted receivers to avoid transmissions to more than one targeted receiver at a time. Additionally, or alternatively, the transmitter simplifies impairment correlation estimation at the receivers by using fixed and/or equal transmit stream power allocations, which reduces the number of distinct model fitting parameters they need to estimate. In any or all such embodiments, the transmitter may transmit control information that directly or indirectly indicates to one or more of the targeted receivers which ones in the plurality of impairment contributors that should be considered.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
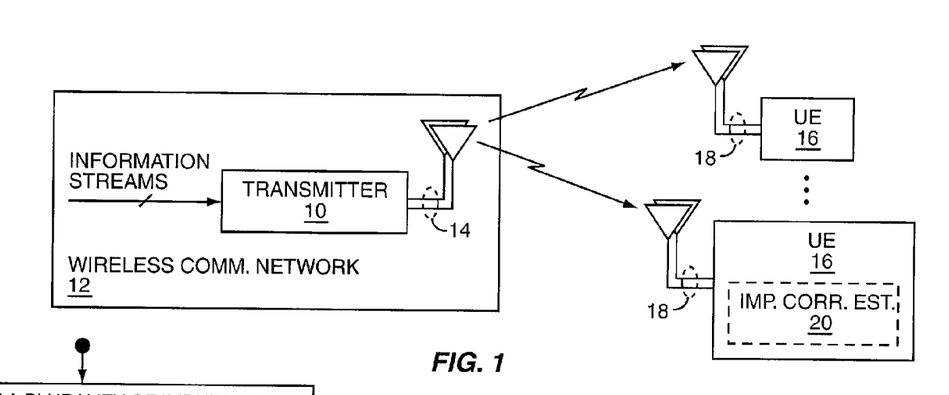
FIG. 1 is a block diagram of one embodiment of a transmitter and a receiver, which has an impairment correlation estimation circuit according to the teachings presented herein.

As a non-limiting example, FIG. 1 illustrates a Multiple-Input-Multiple-Output (MIMO) transmitter 10, comprising part of a MIMO communication system 12. The transmitter 10 transmits signals corresponding to multiple information streams from two or more antennas 14 to a plurality of targeted receivers. In the illustration, the targeted receivers are generically depicted here as various user equipment (UE) 16, each UE 16 including two or more receiver antennas 18. Of particular interest herein, at least one UE 16 includes an impairment correlation estimation circuit 20 that is configured to simplify and improve impairment correlation estimation in a potentially complex interference environment, based on dynamically identifying the impairment contributors that should be considered in impairment correlation estimation.

Figure 2:
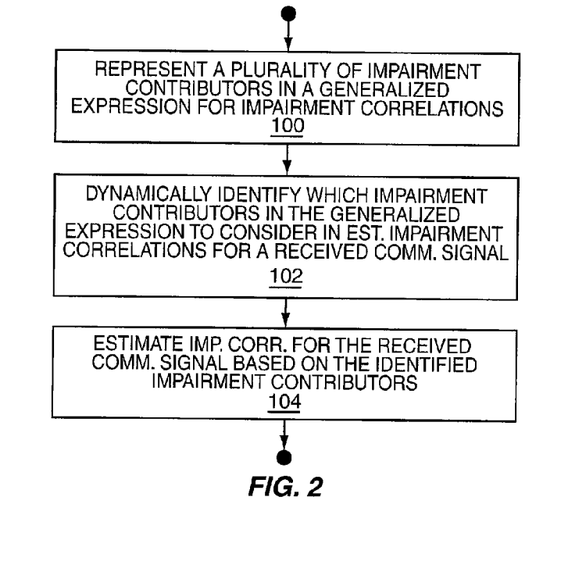
FIG. 2 is a logic flow diagram of one embodiment of processing logic for impairment correlation estimation.

FIG. 2 illustrates processing logic for one embodiment of the impairment correlation estimation circuit 20, which may comprise hardware, software, or any combination thereof. The illustrated processing is based on representing a plurality of impairment contributors in a generalized expression for received signal impairment correlations (Step 100). This step may or may not represent an "active" processing step, in the sense that the impairment correlation estimation circuit 20 may be designed or otherwise programmed to carry out a series of calculations, or a subset of calculations, in impairment correlation estimation, where these calculations correspond to a generalized mathematical expression for impairment correlations.

With its representation of impairment correlations, the impairment correlation estimation circuit 20 is configured to dynamically identify which impairment contributors in the generalized expression to consider in estimating impairment correlations for a received communication signal (Step 102). The impairment correlation estimation circuit 20 estimates impairment correlations for the received signal based on the identified impairment contributors (Step 104).

By estimating impairment correlations for the received communication signal as a function of fewer than all of the possible impairment contributors, i.e., estimating impairment correlations based on an identified subset of impairment contributors, the impairment correlation estimation circuit 20 reduces the computational complexity and improves the performance of impairment correlation estimation. However, the impairment correlation estimation circuit 20 also adapts to changing impairment conditions by dynamically identifying the impairment contributors to be considered in its calculations, such that the subset of impairment contributors considered by it in impairment correlation estimations for one or more received communication signals of interest changes over time with changing impairment conditions.

Figure 3:
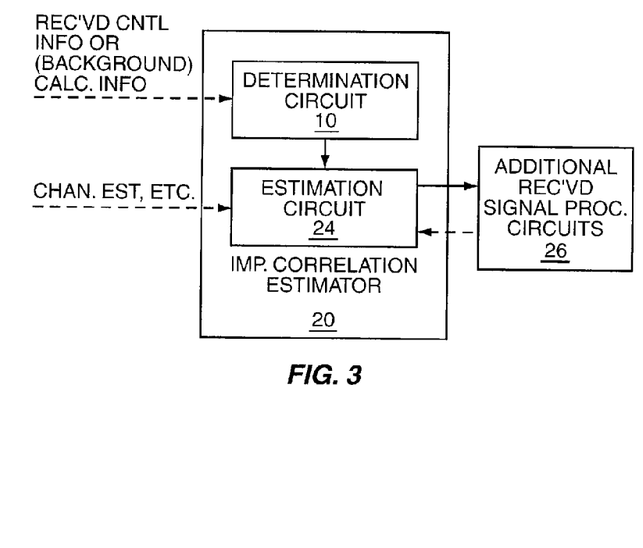
FIG. 3 is a block diagram of one embodiment of a functional circuit details for the impairment correlation estimation circuit of FIG. 1.

FIG. 3 illustrates one embodiment of a functional circuit arrangement for the impairment correlation estimation circuit 20, which comprises a determination circuit 22 and an estimation circuit 24. The determination circuit 22 is configured to dynamically identify which impairment contributors in the generalized expression to consider in estimating impairment correlations for the received communication signal, and the estimation circuit 24 is configured to estimate overall impairment correlations for a received communication signal based on the identified impairment contributors.

Of course, the receiver of the UE 16 includes other functional circuits, including additional received signal processing circuits 26, which may be configured as a Generalized Rake (G-Rake) receiver that improves reception performance by whitening colored interference arising from multiple-access-interference (MAI), for example. More particularly, a G-Rake receiver may place one or more probing fingers off-path for interference characterization, and uses the cross-correlation of interference among Rake fingers to determine combining weights for combining the despread values obtained from two or more Rake fingers for a received communication signal of interest. Thus, in such embodiments, a combining weight generator within the G-Rake receiver generates the combining weights as a function of the impairment correlation estimates generated by the impairment correlation estimation circuit 20.

Similarly, a chip equalizer receiver embodiment of the UE 16 includes a combining weight generator that generates combining weights from the impairment correlation estimates produced by the impairment correlation estimation circuit 20. In such embodiments, a chip equalizer circuit sets equalization filter tap weights based on the combining weight values. In general, the additional received signal processing circuits 26 include some type of interference-suppressing communication receiver that makes use of the impairment correlation estimates generated by the impairment correlation estimation circuit 20. Thus, while not illustrated in FIG. 3, the additional received signal processing circuits 26 may include pilot and traffic signal despreaders, channel estimators, and combining weight generators for received signal combining according to the impairment correlation estimates generated by the impairment correlation estimation circuit 20.

Figure 4:
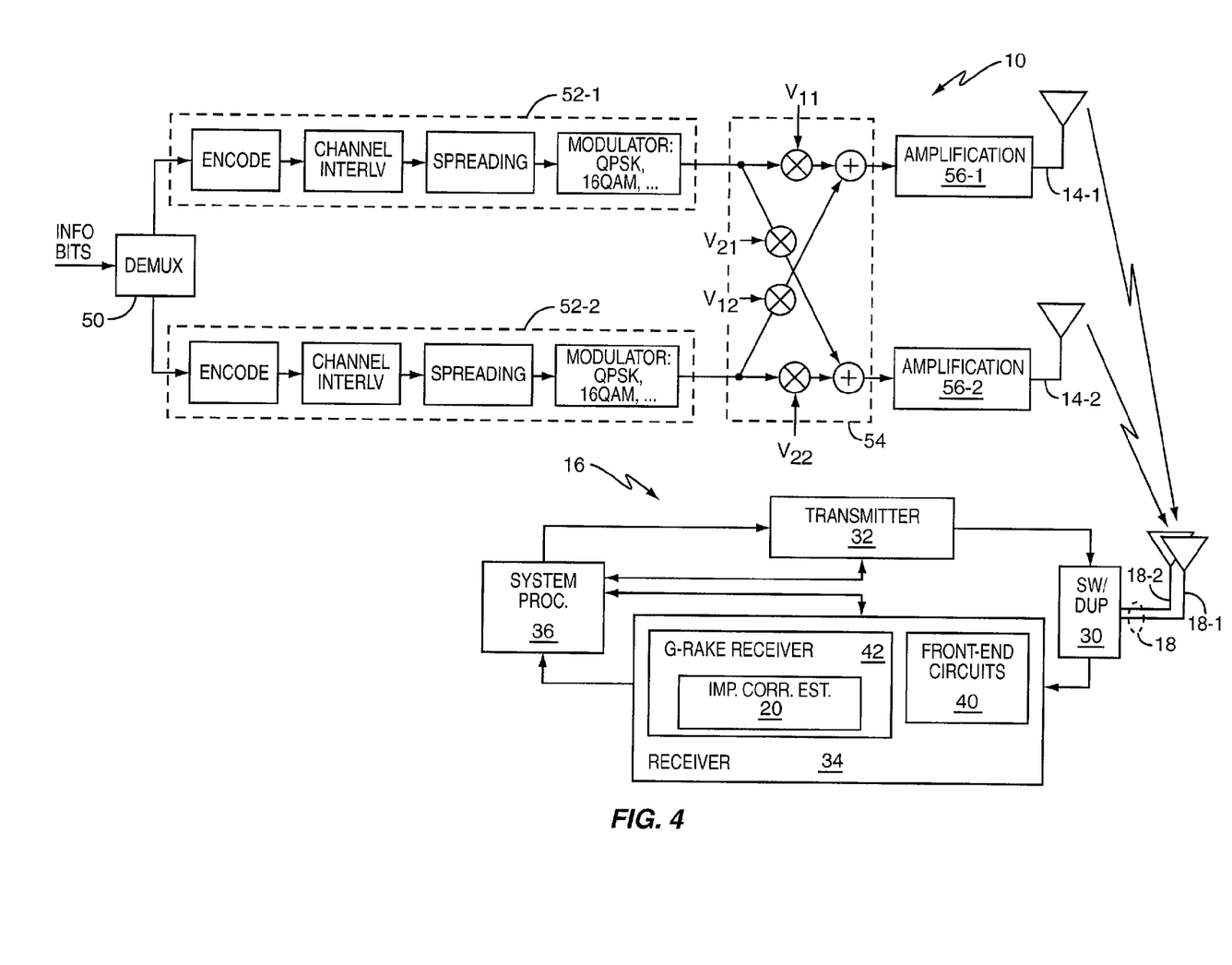
FIG. 4 is a block diagram for MIMO embodiments of the transmitter and receiver depicted in FIG. 1.

By way of non-limiting example, FIG. 4 illustrates additional circuit details for a G-Rake embodiment of the UE 16. In the illustration, the UE 16 is configured for MIMO operation and comprises a switch/duplexer 30, a transmitter 32, a receiver 34, and a system processor/controller 36. The receiver 34 includes front-end circuits 40, and a G-Rake receiver 42, which includes or is associated with an embodiment of the impairment correlation estimation circuit 20. Of course, those skilled in the art will appreciate that the illustrated architecture of the UE 16 represents a non-limiting example, and that other functional circuit arrangements may be used as needed or desired. For example, the particular circuits and circuit arrangement adopted for the UE 16 depends on its intended function. In one or more embodiments, the UE 16 comprises a cellular radiotelephone or other mobile communication terminal (or module), for use in a wireless communication network.

Complementing the MIMO configuration of the UE 16, FIG. 4 illustrates (as a non-limiting example) a dual-antenna MIMO configuration of the transmitter 10. The dual-antenna, two-stream configuration is of particular interest for MIMO transmission in Release 7 of the WCDMA standards, for example. The illustrated embodiment of the transmitter 10 generates transmit signals corresponding to two information streams (streams 1 and 2), for transmission from the dual antennas 14-1 and 14-2.

In transmitter operations, a de-multiplexing circuit 50 separates information bits for the different streams, for stream encoding, spreading, and modulation via dual encoding/modulation circuits 52-1 and 52-2. Note that the use of the same spreading sequence(s) for multiple streams causes code reuse interference. The modulated streams feed into a pre-coder 54, which applies pre-coding weights $\{v_{11}, v_{12}, v_{21}, v_{22}\}$ to the modulated stream signals. Precoded output signals are amplified as needed via amplification circuits 56-1 and 56-2, and transmitted via the antennas 14-1 and 14-2.

In more detail, the illustrated transmitter 10 simultaneously transmits two coded data blocks or streams, where both streams use the same scrambling and channelization code. Prior to transmission, complex antenna pre-coding weights are applied to the modulated stream signals via the pre-coder 54. Ideally, the pre-coding weights applied by the pre-coder 54 approximately orthogonalize the channels to the targeted UEs 16. With perfect orthogonalization and assuming a one-path propagation channel, the propagation channel matrix would appear as diagonal. That is, the effective propagation channel of transmit antenna one (two) to receive antenna two (one) is zero. With this approach, the transmitted streams from the two transmit antennas 14-1 and 14-2 do not interfere with each other.

Of course, the pre-coding weights generally are not perfectly matched to the channel realization and orthogonalization between the two streams is not perfect, meaning that there is some amount of interference between the two streams. Conventionally, addressing cross-stream interference (and other sources) of received signal impairment at the UE 16 involves estimating impairment correlations for a potentially large number of impairment contributors, which is computationally prohibitive, at least at the computational rate required for "live" received signal compensation. As taught herein, however, the impairment correlation estimation circuit 20 can be configured to estimate impairment correlations for a received signal based on simplifying a generalized impairment correlation expression. The simplification is based on dynamically identifying which impairment contributors in the generalized expression to consider.

Understanding a detailed mathematical example of impairment correlation estimation as taught herein begins with a basic notational framework. If x is a complex variable, let x* denote its conjugate. If x is a vector, let $x^t$ denote its transpose and $x^H$ its Hermitian transpose, i.e., the transposed and complex conjugate matrix. With that notation, impairment correlations may be represented by a covariance matrix, which is defined for the random variable column vector x as, $$E((x-E(x))(x-E(x))^H) \quad \text{Eq. (1)}$$

where E(x) denotes the expectation value or mean value. Letting $x^{(n)}$, n=1, . . . , N denote a number of samples of the random variable x, then an estimate of the covariance matrix is calculated as $$\frac{1}{N-1} \sum_{n=1}^{N} (x^{(n)} - \bar{x})(x^{(n)} - \bar{x})^H, \quad \text{Eq. (2)}$$

$$\bar{x} = \frac{1}{N} \sum_{n=1}^{N} x^{(n)}$$

Further notational details include $a^{(p)}$ to represent the amplitude of a physical channel p; $v^{(p,m_{Tx})}$ to represent a complex weight factor that determines how to spread transmit power and phase across transmit antennas 14 (here $|v^{(p,1)}|^2 + |v^{(p,2)}|^2 = 1$); $\Delta_{chip}$ to represent the time length of one (spreading) chip; f to represent a time delay or finger index. For the UE receiver, a time delay used on two different receiver antennas is denoted with two different finger indexes, and a set of fingers (in G-Rake receiver 42) is used to build the covariance matrix. The set usually contains fingers aligned with the propagation channel delays plus one or more additional fingers aligned with off-path, non-propagation channel time delays.

Additional notational details include P to represent the number of physical channels; n to represent the chip index; $\phi$ to denote the convolution of the transmit and receiver pulse-shaping filters, which may be modeled as being the same; L to represent the number of time delays in the propagation channel; and $h_l^{prop,m_{Tx},m_{Rx}}$ to represent the propagation channel for the time delay indexed as l corresponding to transmit antenna $m_{Tx}$ and receive antenna $m_{Rx}$.

With the above notational framework in mind, the following presentation focuses on a G-Rake method embodiment as applied to a two-stream MIMO transmission. However, the presentation applies equally well to chip equalization processing embodiments. In any case, the receiver 34 of the UE 16 demodulates the despread symbol values for a received communication signal by multiplying them with the conjugate of the weighted channel estimates. This operation is represented by $$(R^{Stream,1})^{-1}(v^{(1,1)}h^{CPICH,1} + v^{(1,2)}h^{CPICH,2}) \quad \text{Eq. (3)}$$

for the demodulation of stream 1, and by $$(R^{Stream,2})^{-1}(v^{(2,1)}h^{CPICH,1} + v^{(2,2)}h^{CPICH,2}) \quad \text{Eq. (4)}$$

for the demodulation of stream 2. In Eq. (3) and Eq. (4), $R^{Stream,i}$ represents the impairment correlation estimates for stream i, $h^{CPICH,m_{Tx}}$ is a column vector containing Common Pilot Channel (CPICH) estimates as seen from transmit antenna $m_{Tx}$, where the CPICH signal is received in conjunction with the desired information streams.

In one embodiment, the receiver 34 computes CPICH channel estimates by despreading the CPICH for every time delay of interest, multiplying the despread values with the conjugate of the known pilot symbols, and averaging the resulting products over a slot. One may observe that $h^{CPICH,m_{Tx}}$ contains channel estimates for both receive antennas. Typically, in a MIMO transmission for WCDMA, the CPICH signal is transmitted from both transmit antennas 14-1 and 14-2, where the transmitted symbols are pair-wise orthogonal. This circumstance can be modeled as the CPICH consisting of two physical channels, each channel of spreading factor 512, and being transmitted on separate antennas.

Continuing, one may assume that the two-stream data flow to be demodulated by the receiver 34 is indexed as physical channel p=1 and p=2. In the immediately below expression, the physical channels indexed as $p=P_1+1, \ldots, P$ are assumed to be transmitting the same chip stream from both transmit antennas 14-1 and 14-2. However, the actual physical transmissions from the antennas 14-1 and 14-2 are determined by the phase parameters $v^{(p,m_{Tx})}$ applied by the pre-coder 54. In any case, the covariance matrix for stream 2 (physical channel p=2) can be shown to equal the following expression for the matrix element $(f_1, f_2)$:

$$R_{f_1,f_2}^{Stream,1} = \frac{1}{sf}(a^{(1)})^2 \quad \text{Eq. (5)}$$

$$\sum_{m_{Tx}=1}^{2} \sum_{\substack{l_1=1 \\ l_2=1}}^{L} h_{l_1}^{prop,m_{Tx},m_{Rx_1}} v^{(p,m_{Tx})} \cdot \left(h_{l_2}^{prop,m_{Tx},m_{Rx_2}} v^{(p,m_{Tx})}\right)^*$$

$$\sum_{n=-\infty}^{\infty} \varphi(\hat{\tau}_{f_1} + n\Delta_{chip} - \tau_{l_1}) \varphi(\hat{\tau}_{f_2} + n\Delta_{chip} - \tau_{l_2}) +$$

$$\frac{1}{sf} \sum_{p=2}^{P_1} (a^{(p)})^2 \sum_{m_{Tx}=1}^{2} \sum_{\substack{l_1=1 \\ l_2=1}}^{L} h_{l_1}^{prop,m_{Tx},m_{Rx_1}}$$

$$v^{(p,m_{Tx})} \cdot \left(h_{l_2}^{prop,m_{Tx},m_{Rx_2}} v^{(p,m_{Tx})}\right)^*$$

$$\sum_{n \neq 0} \varphi(\hat{\tau}_{f_1} + n\Delta_{chip} - \tau_{l_1}) \varphi(\hat{\tau}_{f_2} + n\Delta_{chip} - \tau_{l_2}) +$$

$$\frac{1}{sf} \sum_{p=P_1+1}^{P} (a^{(p)})^2 \sum_{\substack{l_1=1 \\ l_2=1}}^{L} \left(h_{l_1}^{prop,1,m_{Rx_1}} v^{(p,1)} + h_{l_1}^{prop,1,m_{Rx_1}} v^{(p,2)}\right)$$

$$\left(h_{l_2}^{prop,1,m_{Rx_2}} v^{(p,1)} + h_{l_2}^{prop,2,m_{Rx_2}} v^{(p,2)}\right)^* \cdot$$

$$\sum_{n \neq 0} \varphi(\hat{\tau}_{f_1} + n\Delta_{chip} - \tau_{l_1})$$

$$\varphi(\hat{\tau}_{f_2} + n\Delta_{chip} - \tau_{l_2}) + \sigma^2 \varphi(\hat{\tau}_{f_1} - \hat{\tau}_{f_2})$$

Here the index $m_{Rx_1}$ is the receive antenna associated with finger $f_1$ and index $m_{Rx_2}$ is the receive antenna associated with finger $f_2$, and the quantities $(a^{(p)})^2$ and $\sigma^2$ are the effective fitting parameters. They correspond to the received power allocated to the p-th channel and to the power of the unmodeled interference respectively. The covariance matrix for stream 1 is estimated according to Eq. (5), but with the role of physical channel one and two interchanged. Further, the covariance matrix applicable to despreading the CPICH with a spreading factor 512 can be shown to equal the following for the matrix element $(f_1, f_2)$:

$$R_{f_1,f_2}^{CPICH} = \frac{1}{512} \sum_{p=1}^{P_1} (a^{(p)})^2 \quad \text{Eq. (6)}$$

$$\sum_{m_{Tx}=1}^{2} \sum_{\substack{l_1=1 \\ l_2=1}}^{L} h_{l_1}^{prop,m_{Tx},m_{Rx_1}} v^{(p,m_{Tx})} \cdot \left(h_{l_2}^{prop,m_{Tx},m_{Rx_2}} v^{(p,m_{Tx})}\right)^*$$

$$\sum_{n \neq 0} \varphi(\hat{\tau}_{f_1} + n\Delta_{chip} - \tau_{l_1}) \varphi(\hat{\tau}_{f_2} + n\Delta_{chip} - \tau_{l_2}) +$$

$$\frac{1}{sf} \sum_{p=P_1+1}^{P} (a^{(p)})^2 \sum_{\substack{l_1=1 \\ l_2=1}}^{L} \left(h_{l_1}^{prop,m_{Rx_1}} v^{(p,m_{Tx})} + h_{l_1}^{prop,2,m_{Rx_1}} v^{(p,m_{Tx})}\right)$$

-continued $$\left(h_{l_2}^{prop,1,m_{Rx2}} v^{(p,m_{Tx})} + h_{l_2}^{prop,2,m_{Rx2}} v^{(p,m_{Tx})}\right)^*.$$

$$\sum_{n \neq 0} \varphi(\hat{\tau}_{f_1} + n\Delta_{chip} - \tau_{l_1})$$

$$\varphi(\hat{\tau}_{f_2} + n\Delta_{chip} - \tau_{l_2}) + \sigma^2 \varphi(\hat{\tau}_{f_1} - \hat{\tau}_{f_2})$$

By letting $h^{prop,m_{Tx},m_{Rx}}$ be a column vector representing the propagation channel for the time delays l=1, . . . , L, one may show that $h^{prop,m_{Tx},m_{Rx}}$ equals $\Phi^{-1} h^{CPICH,m_{Tx},m_{Rx}}$, where $h^{CPICH,m_{Tx},m_{Rx}}$ is a column vector containing the CPICH channel estimates between transmit antenna $m_{Tx}$ and receive antenna $m_{Rx}$ for time delays l=1, . . . , L, and where matrix entry $\Phi_{l_1,l_2} = \phi(\tau_{l_1} - \tau_{l_2})$.

Because the receiver 34 has knowledge of the pilot symbols received on the CPICH, the G-Rake receiver 42 can directly estimate the CPICH covariance matrix $R^{CPICH}$ based on measurements made by G-Rake receiver 42. For example, in a straight-forward approach to direct covariance estimation, one may use Eq. (2), but with x replaced by CPICH samples taken over a transmission slot. One may obtain the required CPICH samples by despreading the CPICH over 512 chips and multiplying the symbol with the conjugate of the known symbol. For WCDMA-based CPICH signals, a total of five samples are obtained in a given slot.

However, for interference suppression and/or signal quality estimation for the received communication signals, e.g., the stream 1 and stream 2 traffic signals, the G-Rake receiver 42 must determine impairment correlations for signals having unknown data symbols in them. A parametric approach to determining impairment correlations for the received signal streams (e.g., streams 1 and 2) "fits" a parametric model of impairment correlations for the unknown received communication signals to the impairment correlations measured for the CPICH signal. That is, the impairment covariance matrix $R^{Stream,i}$ represents a number of parametrically modeled impairment contributors, with each model term or value having a corresponding model fitting parameter. The values of the model fitting parameters can be determined according to a least-squares (LS) fitting solution, for example, wherein a "best-fit" solution for the plurality of model fitting parameters is determined by fitting the parametrically modeled impairment correlations to the measured covariance matrix $R^{CPICH}$.

For a given parametric model, the LS fitting of the fitting parameters $a^{(p)}$ may for example be realized by computing a column vector $$a = (A^H A)^{-1} A^H p \qquad \text{Eq. (7)}$$

where the column vector p is formed by stacking the directly-estimated matrix $R^{CPICH}$ column-wise and the i-th column of A is formed by stacking the constructed covariance matrix for stream i column-wise. Thus, a simple parametric MIMO G-Rake implementation might model $R^{Stream,i}$ as given in Eq. (5), and then fit the CPICH-based directly estimated $R^{CPICH}$ to the modeled $R^{Stream,i}$ as the basis for obtaining the model fitting parameters.

However, such a fitting process generally results in incorrect fitting parameters due to model mismatch. For example, the transmitter 10 may reuse channelization parameters across the transmit antennas 14, e.g., it may reuse the same spreading code and/or transmission frequency (in OFDM embodiments) for different information streams. Channelization parameter reuse results in cross-stream interference at the UE 16, which generally cannot be neglected. More particularly, channelization parameter reuse causes a different inner summation spanning over all n in the first term of $R^{Stream,i}$, effectively adding an different inner summation spanning over all n in the first term of $R^{Stream,i}$, effectively adding an additional interference component. (The corresponding term in $R^{CPICH}$ sums over n≠0.) A better receiver thus would fit the covariance matrix $R^{CPICH}$, as directly estimated from CPICH measurements, to the modeled $R^{CPICH}$. Additionally, if another physical channel uses the same weights $v^{(p,m_{Tx})}$ as stream 1, then a LS fitting approach will not be able to separate out the fitting parameter $a^{(1)}$, but will instead estimate the energy of all physical channels employing the weights coinciding with the physical channel 1 weights. Further, if all physical channels use different weights $v^{(p,m_{Tx})}$ at the transmit pre-coder 54, then the receiver would estimate the individual fitting parameters, and consequently use them to analytically construct $R^{Stream,i}$.

Generally, however, the ability to determine model fitting parameters with reasonable accuracy from the potentially noisy measurements of covariance represented by $R^{CPICH}$ depends on there being relatively few model fitting parameters being simultaneously fitted. In the MIMO transmission/reception context of FIG. 4, and in other complex impairment environments, accurate and complete parametric modeling must consider a potentially large number of impairment contributors, meaning that a correspondingly large number of model fitting parameters must be determined from the measured impairment correlations. Not only is such a determination computationally burdensome, attempting to determine a best-fit model fitting parameter solution for a large number of fitting parameters compromises the overall accuracy of model fitting parameter determination.

Rather than using a conventional brute-force fitting parameter determination approach applied to environments with simpler impairment conditions, e.g., Single-Input-Single-Output (SISO) transmission systems, the impairment correlation estimation circuit 20 is configured according to a method wherein it dynamically identifies the impairment contributors represented in its generalized expression for impairment correlations that should be considered in estimating impairment correlations for a received communication signal. As such, the G-Rake receiver 42 reduces the number of fitting parameters to be estimated.

In at least one embodiment of the G-Rake receiver 42, the included or associated impairment correlation estimation circuit 20 is configured to implement a method of estimating impairment correlations based on representing a plurality of impairment contributors in a generalized expression for impairment correlations. To avoid involving too many model fitting parameters for any given estimation of the impairment correlations for the received communication signal(s) of interest, the method includes dynamically identifying which impairment contributors in the generalized expression for impairment correlations to consider in estimating impairment correlations for a received communication signal. Doing so reduces the number of parametric model fitting parameters fitted to directly measured impairment correlations as represented in the CPICH covariance matrix, $R^{CPICH}$. Thus, the method further includes estimating impairment correlations for the received communication signal based on the identified impairment contributors.

In at least one such embodiment, the impairment correlation estimation circuit 20 dynamically identifies which impairment contributors in the generalized expression to consider based on received control information, or based on impairment correlation measurements made at the receiver. For example, the transmitter 10 may be configured to implement a method wherein it reduces the number of impairment contributors that need to be considered at the UE 16. In one embodiment, the transmitter 10 transmits communication signals to a plurality of targeted receivers (UEs 16) based on transmitting one or more information streams for individual ones of the targeted receivers according to ongoing transmission scheduling. Additionally, the transmitter 10 controls the ongoing transmission scheduling to reduce the number of impairment contributors that must be considered in received signal processing by scheduled ones of the targeted receivers. Accordingly, the transmitter 10 may include one or more appropriately configured processing circuits acting as a transmission scheduling controller.

In one such embodiment, controlling the ongoing transmission scheduling to reduce the number of impairment contributors that must be considered in received signal processing by scheduled ones of the targeted receivers includes restricting the number of simultaneously transmitted different information streams to not exceed a defined number of transmit pre-coding weight combinations and applying distinct transmit precoding weights to each of them. In another embodiment, controlling the ongoing transmission scheduling to reduce the number of impairment contributors that must be considered in received signal processing by scheduled ones of the targeted receivers includes scheduling the targeted receivers to avoid transmissions to more than one targeted receiver at a time.

In another embodiment, controlling the ongoing transmission scheduling to reduce the number of impairment contributors that must be considered in received signal processing by scheduled ones of the targeted receivers includes using equal and/or fixed transmit stream power allocations. Adopting equal transmit stream power allocations, for example, simplifies fitting parameter estimation at the receiver because it results in the occurrence of repetitive (like-valued) fitting parameters, which, at the receiver, can be detected and "lumped" together in the parametric model fitting process.

In at least one embodiment, in addition to controlling transmission scheduling in a manner that reduces the number of impairment contributors that must be considered in impairment correlation estimation at the UEs 16, the transmitter 10 is configured to transmit control information that directly or indirectly indicates to one or more of the targeted UEs 16 which impairment contributors should be considered. That is, the transmitter 10 may be configured to transmit information that indicates which impairment contributors should be considered by the impairment correlation estimation circuit 20, and may update the transmitted control information to reflect changing transmit scheduling/impairment conditions. Thus, the impairment correlation estimation circuit 20 can identify which impairment contributors to consider based on received control information that directly or indirectly indicates which impairment contributors should be considered in estimating impairment correlations for the received communication signal.

Alternatively, and, perhaps, more flexibly, the correlation estimation circuit 20 can be configured to identify which impairment contributors to consider based on impairment correlation measurements made at the receiver 34. For example, as noted, the G-Rake receiver 42 can be configured to measure impairment correlations for a pilot signal received in conjunction with the received communication signal. The impairment correlation estimation circuit 20 uses those measurements to identify non-negligible ones of the impairment contributors and/or to identify the unique fitting parameters to be considered.

For example, certain transmit signal structures, such as equal transmit stream power allocations, result in non-distinct model fitting parameter values for two or more impairment contributors in the model, so estimation of model fitting parameters for those contributors collapses into the estimation of one value. As another example, in one embodiment, the impairment correlation circuit 20 determines non-negligible ones of the impairment contributors by fitting a parametric model of impairment correlations to the measured impairment correlations, wherein the fitting process involves one or more fitting operations carried out during background processing. With background processing, for example, all of the fitting parameters can be determined over a given time interval by incrementally fitting impairment model terms or values corresponding to different impairment contributors (or related subgroups of impairment contributors) to CPICH measured impairment correlations. Moreover, background processing allows accurate estimation of even a relatively large number of model fitting parameters, because estimation results can be filtered over the background interval.

In any case, one or more embodiments of identifying fitting parameters of interest involve calculating values for a plurality of fitting parameters corresponding to different impairment contributors represented in the parametric model of impairment correlations, and observing relative or absolute values of the fitting parameters to identify non-negligible ones of the impairment contributors. However, because the model fitting parameter values can be calculated individually, or in related subgroups, as part of background processing, the overall processing load (and the quality of fitting parameter determinations) is improved. At any given time, only a subset of the possible impairment contributors may represent non-negligible contributors to received signal impairment. Thus, the impairment correlation estimation circuit 20 is configured to calculate an overall impairment correlation estimate for the received communication signal as a function of the impairment contributors currently identified as non-negligible. The overall impairment correlation estimate may be used by the G-Rake receiver 42 for suppressing interference in the received communication signal and/or for estimating signal quality for the received communication signal.

With the above approach, the impairment correlation estimation circuit 20 can be configured to calculate the overall impairment correlation estimate in a given first time interval using a simplified parametric model that considers only the impairment contributors identified as non-negligible. With that, dynamically identifying which impairment contributors in the generalized expression to consider in estimating impairment correlations for a received communication signal may be based on performing background impairment correlation calculations over a second time interval longer than the first time interval. That is, the impairment correlation estimation circuit 20 may perform running or periodic calculations in the background, to identify non-negligible ones of the impairment contributors for consideration in the overall impairment correlation estimate to be made for the received communication signal as part of foreground received signal processing.

In a detailed example, the impairment correlation estimation circuit 20 represents a plurality of impairment contributors in a generalized expression for impairment correlations as a parametric model of impairment correlations representing a plurality of impairment contributors. With that representation, the impairment correlation estimation circuit 20 identifies the impairment contributors that should be considered in a current, overall estimate of received signal impairment correlations based on observing relative or absolute fitting parameter values corresponding to the plurality of impairment contributors represented in the parametric model, to identify non-negligible ones of the impairment contributors. That is, the individual fitting parameters correspond to respective ones in the plurality of impairment contributors, and observing the (background) calculated values of these fitting parameters indicates which impairment contributors are non-negligible. For example, the impairment correlation estimation circuit 20 can be configured to perform (parametric) model fitting calculations using measured (CPICH) impairment correlations as part of background processing in the G-Rake receiver 42, and to observe the relative or absolute values of the resultant model fitting parameters over time, to identify non-negligible ones of the impairment contributors.

Figure 5:
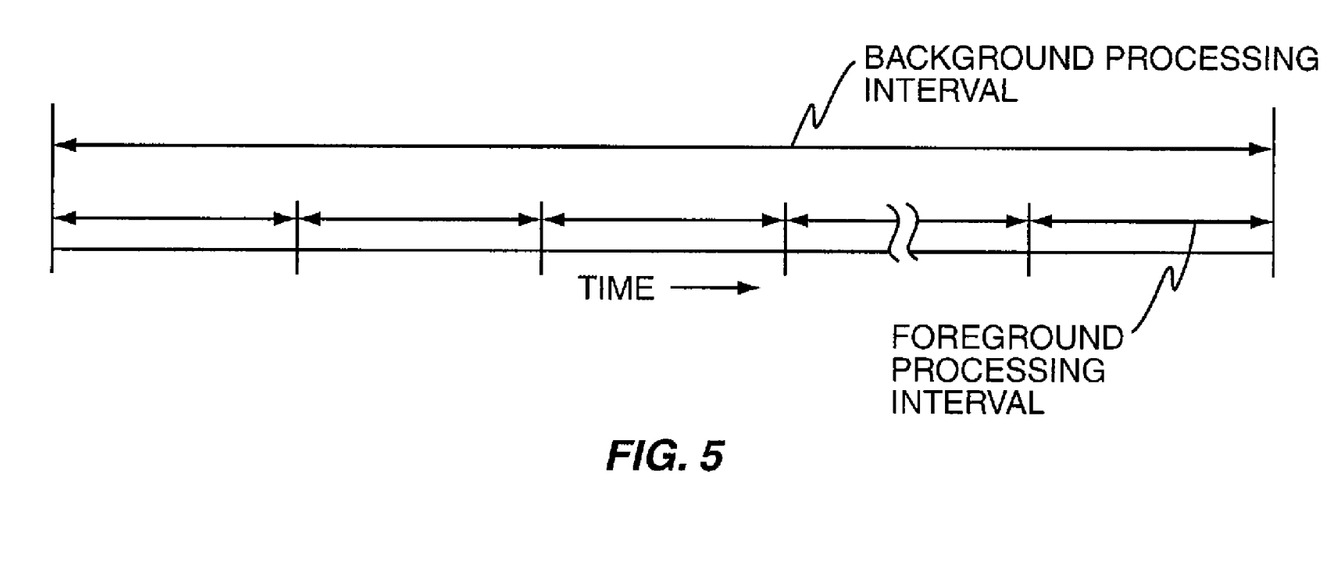
FIG. 5 is a diagram of background and foreground processing intervals as used in one or more embodiments of impairment correlation estimation.

FIG. 5 illustrates one such embodiment, wherein the impairment correlation estimation circuit 20 makes CPICH measurements and directly estimates CPICH covariance repeatedly over a background processing interval. Moreover, the impairment correlation estimation circuit 20 uses the directly estimated covariance to calculate fitting parameter values for individual ones or related subgroups of the fitting parameters in the parametric model of received signal impairment correlations. In any given background fitting process, the number of fitting parameters being determined may be smaller compared to the overall number of impairment contributors represented in the complete parametric model, and the pilot-based impairment correlation measurements thus provide a good basis for fitting parameter determination. Further, as previously noted, even in embodiments where the background determination process considers all fitting parameters simultaneously, the relatively long processing time afforded by the background processing approach allows for efficient filtering and, thus, reasonable parameter estimation quality.

As further illustrated, the background processing interval spans a number of foreground processing intervals, which may be based on frame/slot timing of the received communication signal. In a general embodiment, the impairment correlation estimation circuit 20 computes a new overall estimate of impairment correlations for the received communication signal(s) in each foreground processing interval, based on the impairment contributors currently identified as non-negligible in accordance with ongoing background processing. That is, to make an actual estimate of overall impairment correlations, such as for interference suppression and/or received signal quality determination, the impairment correlation estimation circuit fits parametric model terms corresponding to the non-negligible ones of the impairment contributors to measured impairment correlations as currently measured for the foreground processing interval.

For MIMO embodiments of the transmitter 10 and UE 16, one may understand the above processing as dynamically identifying which impairment contributors in the generalized expression to consider in estimating impairment correlations for a received communication signal based on determining one or more MIMO transmission parameters for the received communication signal. In other words, by observing the behavior of the model fitting parameters corresponding to the different impairment contributors, the impairment correlation estimation circuit 20 can infer which impairment contributors are non-negligible. Such observation may comprise comparing the relative values of model fitting parameters, or comparing the absolute values of model fitting parameters to one or more thresholds, for example. In either instance, the comparisons provide a ready basis for identifying non-negligible ones of the impairment contributors in that the non-negligible impairment contributors are expected to correspond to the model fitting parameters having the greatest magnitudes.

To visualize the above operations, one may generalize the relationship between the CPICH covariance and the covariance experienced by the k-th communication signal stream as follows, taking also into account possibility of successive-interference-cancellation (SIC) operation in the G-Rake receiver 42:

$$R^{Stream,k}=R^{CPICH}+\Sigma_{s\in A}\gamma^{(s)}R^{CR,s}-\Sigma_{s\in\Gamma}\gamma^{(s)}R^{SIC,s} \qquad \text{Eq. (8)}$$

where the code reuse term by stream s $R^{CR,s}$ is due to the interfering MIMO stream of the same user ($A=\{i|i=1 \ldots s, i\neq k\}$ for non-SIC receiver, $A=\{i|i=k+1 \ldots s\}$ for a SIC receiver). The SIC term $R^{SIC,s}$ accounts for any cancelled interference that is still present after CPICH despreading ($\Gamma=\{i|i=1\ldots k-1\}$ for a SIC receiver, otherwise $\Gamma=\{\}$. In Eq. (8), it may be advantageous to have the possibility to "penalize," or otherwise discount the the factor $\gamma^{(s)}$, that is, to diminish the influence of the code-reuse term. Doing so may be particularly beneficial in certain circumstances, such as where several UEs/physical channels share a transmit preceding weight or beam. The penalization of $\gamma^{(s)}$ could be modeled as $k^{(s)}\cdot\gamma^{(s)}$, where $k^{(s)}$ is a factor larger than zero but less than or equal to one. Further, if it is known that several UEs share a beam, $k^{(s)}$ should be made smaller, e.g., close to zero. One approach is to set $k^{(s)}$ to 0.5

Eq. (8) offers a generalized expression for the covariance terms determined from the CPICH signal, where the origin of the different interference and noise contributions (impairment contributors) is not specified in detail. However, the impairment correlation estimation circuit 20 may be configured to use a re-formulated generalized expression, which does account for the different possible impairment contributors. In the example of FIG. 4, the CPICH covariance contributors are the U MIMO users from the same cell, the common channels, pilot signals, and other non-beam formed (non-precoded) signals transmitted in the same cell, along with other-cell interference and (thermal) noise impairment components. Of course, this scenario represents just one impairment example, and the teachings herein are applicable to a variety of transmitter/receiver structures and operation. For example, in other embodiments, the other-cell signals, and/or the own-cell non-MIMO signals may be modeled in more detail or in other configurations.

In any case, continuing with the example at hand, the total impairment covariance consists of the following parts:

$$R^{CPICH}=\Sigma_{k=1}^{S}\gamma^{(k)}R_u^k+\Sigma_{u=2}^{U}\Sigma_{k=1}^{S}\gamma_u^{(k)}R_u^k+\alpha R_c+\beta R_n \qquad \text{Eq. (9)}$$

where $\gamma^{(k)}$, $\gamma_u^{(k)}$, $\alpha$, $\beta$ are model fitting parameters. Given the above relationship, one sees that all the fitting parameters that are relevant to building the covariance matrix for a desired data stream $R^{Stream,k}$ are also represented in the CPICH covariance construction. Thus, the impairment correlation estimation circuit 20 can estimate $R^{Stream,k}$ by carrying out CPICH covariance fitting procedures.

As may be seen, the covariance model $R^{CPICH}$ depends on a potentially large number of fitting parameters. The particular model contains US+2 parameters, if U MIMO users are active, each transmitting S streams. (In Release 7 of WCDMA, only $U\leq 4$ users are uniquely identifiable due to the codebook size used for the pre-coding weight values in the pre-coder 54. If U>4, several users will be lumped together in parametric estimation.) As noted, the conventional all-at-a-time approach to estimating all of these fitting parameters is labor-intensive and leads to low-quality estimates.

By basing "live" impairment correlation estimations on a reduced subset of impairment contributors, e.g., those impairment contributors identified as non-negligible, the impairment correlation estimation circuit 20 improves parametric estimation performance and reduces the computation complexity of such estimations.

For example, assume that the scheduling processor at the transmitter 10 only schedules one MIMO user at a time, at least for a given window of scheduled operations. If no other MIMO user is scheduled simultaneously with the desired user, all of the fitting parameters $\gamma_u^{(k)}=0$, and the number of fitting parameters to be estimated reduce to S+2.

The transmitter 10 may signal one-at-a-time scheduling to the UE 16, and the impairment correlation estimation circuit 20 accordingly may omit the $\gamma_u^{(k)}$ fitting parameters from the model fitting operations performed in its estimation of overall impairment correlations for the received communication signals. Alternatively, the impairment correlation estimation circuit 20 can infer that the transmitter is using one-at-a-time scheduling by observing the zero (or negligibly small) values computed by it for the $\gamma_u^{(k)}$ model fitting parameters as part of its background processing. For example, the impairment correlation estimation circuit 20 may be configured to ignore the parametric model terms corresponding to the $\gamma_u^{(k)}$ model fitting parameters in its foreground estimation of overall impairment, based on observing that, over the same background processing interval, its background-estimated values for the $\gamma_u^{(k)}$ model fitting parameters are sufficiently small compared to the background-estimated $\gamma^{(k)}$ model fitting parameters.

The background observation interval length may be system- and implementation-specific. For example, for WCDMA embodiments, the background observation interval may span several WCDMA Transmission Time Intervals (TTIs). Regardless, once the impairment correlation estimator 20 identifies which impairment contributors to consider—equivalently, after it identifies which impairment contributors to ignore—it may operate accordingly for an extended time period, because the scheduling strategy at the transmitter 10 is expected to be fixed, or at least constant for a relatively long time period. Such operation gives the impairment correlation estimation circuit 20 a relatively long time over which to step through its background calculations of the all the model fitting parameters corresponding to the modeled impairment contributors, thereby lessening computational requirements. Indeed, the decision process itself may be distributed over time, such that a background verification process with minor complexity is constantly in progress, but where the decision about which impairment contributors to consider or ignore is updated relatively infrequently.

Another simplifying circumstance arises where the transmitter 10 allocates equal power to both streams for a given user, or allocates powers according to a known ratio for the different information streams. If both streams are allocated equal power, then $\gamma_u^{(k)}=\gamma_u$ over all k and $\gamma^{(k)}=\gamma$ over all k. Consequently, the number of fitting parameters involved in the overall estimation of impairment correlation for the received communication signal reduces to U+2. The impairment correlation estimation circuit 20 may infer equal power weighting (or known power ratio weighting) by observing by observing that the background-calculated fitting parameters may be approximated as $\gamma_u^{(1)}=\gamma_u^{(2)}$ (for streams 1 and 2) over the observation interval.

Notably, if only one MIMO user at a time is scheduled, and if equal (or known-ratio) stream power allocations are used, then the number of fitting parameters that need be considered by the impairment correlation estimation circuit 20 reduces to three (3).

In another simplifying scenario, the transmitter 10 may operate such that only one MIMO user at a time is assigned a given pre-coding weight set. Such operation allows the impairment correlation estimation circuit 20 to identify the individual MIMO users' fitting parameters and, by extension, allows it to convert the CPICH covariance model correctly to the MIMO stream covariance model. The impairment correlation estimation circuit 20, or other circuitry within the receiver 34 may be configured to detect violations of the pre-coding assignment constraints by the scheduler, based on observing degraded impairment correlation estimation performance at the receiver, e.g., such as by observing reduced interference suppression performance.

In another simplifying circumstance, the instantaneous antenna weights used at the transmitter 10 result in negligible interference at the receiver 34 from the other stream. Thus, if the transmit pre-coding weights efficiently orthogonalize the streams as they are transmitted from the transmit antennas 14 to a given UE 16, the cross-stream interference at that UE 16 arising from channelization parameter reuse becomes negligible. In such cases, channelization parameter reuse and SIC (if used at the UE 16) have no impact on received signal covariance, meaning that $R^{Stream,k}=R^{CPICH}$. In this case, the common channel-induced same-cell interference will also be negligible, whereby the only remaining parametric model term for impairment correlation is the noise term $R_n$, and no model fitting is needed.

The favorable channel conditions, which generally will not be persistent, can be identified by the impairment correlation estimation circuit 20 based on it verifying that a single dominant path is present (e.g. by using the channel estimates or Power Delay Profile magnitudes for the path positions in question) and by assessing whether the effective end-to-end channel $V^H H^H H V$ is sufficiently diagonal. Here, $V=[v_1 \ldots v_{M_{Tx}}]$ is the antenna weight matrix and $$H = \begin{bmatrix} h_1 \\ \vdots \\ h_{M_{Rx}} \end{bmatrix} \qquad \text{Eq. (10)}$$

is the full channel coefficient matrix, where each matrix element is a scalar. Note that the diagonal condition may be check based on the ratio of the max non-diagonal element and smallest diagonal element, e.g., checking whether the ratio is smaller than a pre-determined threshold. Other checking criteria are also possible.

In another simplifying circumstance, the UE 16 may be located sufficient close to the transmitter 10, which may be one in a plurality of network base stations, such that the same-cell interference is dominant, and the other-cell interference and receiver noise may be ignored. In such cases, the other-cell and noise impairment terms in Eq. (9) may be omitted and the corresponding fitting parameters need not be estimated as part of estimating received signal impairment correlations. In such circumstances, the number of fitting parameters to be estimated reduces by one (or more, depending upon the parametric model). The impairment correlation estimation circuit 20 can be configured to recognize when this impairment condition exists based on observing that the estimated fitting parameter $\beta$ is small compared to $\alpha$, $\gamma_u^{(s)}$, $\gamma^{(s)}$ over the background observation interval.

Broadly, then, in at least one embodiment, impairment correlation estimation as taught herein comprises representing the impairment correlations for a received communication signal of interest using a parametric model of impairment correlations. The parametric model, such as that given in Eq. (9) serves two purposes. First, the impairment correlation estimation circuit 20 performs background processing to identify which impairment contributors represented in the model should be considered in making a "live" estimate of the received signal impairment correlations. The impairment correlation estimation circuit 20 generally performs these live estimates as part of foreground processing, such as in making real-time or near real-time estimates of received signal quality for channel quality information feedback to the transmitter 10, and/or for ongoing interference suppression for the received communication signal via combining weight generation.

More particularly, at a slower rate, or on an intermittent basis, the impairment correlation estimation circuit 20 performs a series of LS fitting calculations, wherein it fits individual ones of the parametric model terms, or related subgroups of them, to CPICH-based measured impairment correlations. By working with one or a few fitting parameters at a time, or by applying long-term averaging to the values obtained for an even larger number of fitting parameters, such background fitting operations yield relatively good model fitting results. Moreover, by observing the relative or absolute values of the background-calculated fitting parameters, the impairment correlation estimation circuit 20 identifies which impairment contributors should be considered in the live calculation of received signal impairment correlations. Then, for any given foreground calculation of received signal impairment correlation, the impairment correlation estimation circuit simplifies the model fitting calculation by including only those parametric model terms corresponding to the identified (non-negligible) impairment contributors.

Broadly, the teachings herein may be understood as providing a receiver circuit and corresponding receiver methods wherein impairment correlation estimation for a received communication signal is simplified and improved. In at least one embodiment, the simplifications and corresponding improvements (in estimation quality) derive from limiting the number of model fitting parameters involved in fitting a parametric model of impairments to measured impairment correlations, for purposes of estimating impairment correlations.

For example, one or more embodiments include dynamically identifying which impairment contributors to consider in a generalized expression for impairment correlations by identifying which fitting parameters in a parametric model of impairment correlations having individual fitting parameters corresponding to the plurality of impairment contributors are of interest in estimating impairment correlations for the received communication signal. In at least one such embodiment, identifying the fitting parameters that are of interest comprises determining which impairment contributors are non-negligible based on direct or indirect knowledge of a transmit signal structure used in transmission of the received communication signal.

In the same or other embodiments, the method includes acquiring direct knowledge of the transmit signal structure based on received information, e.g., receiving information relating to a transmit signal structure used in transmitting the received communication signal. Alternatively, the method includes acquiring indirect knowledge of the transmit signal structure by calculating values for some or all of the fitting parameters in the parametric model of impairment correlations, and evaluating their relative or absolute values over one or more evaluation intervals.

Regardless of how the receiver acquires knowledge of the transmit signal structure, one or more embodiments comprise, for the case where the transmit signal structure comprises transmitting to one scheduled user at a time, determining that fitting parameters corresponding to other users are not of interest. In other words, if the UE 16 is told or can infer that the transmitter is transmitting only to one UE 16 at a time, then the UE 16 can simplify its impairment correlation estimations by excluding from consideration the model fitting parameters corresponding to other-user terms in the parametric model. As a further beneficial simplification, one or more embodiments include, for the case where the transmit signal structure comprises transmitting multiple information streams with equal power, determining that fitting parameters corresponding to the equal-power information streams are like-valued. With that determination, fitting parameter determination can be simplified by using a commonly estimated fitting parameter value for parametric model terms corresponding to the equal-power information streams.

The above scenarios stand as non-limiting examples. Therefore, it should be understood that identifying the fitting parameters that are of interest may comprise, more generally, selecting particular fitting parameters, or particular groups of fitting parameters, from among the plurality of fitting parameters in the parametric model of impairment correlations based on knowledge of a transmit signal structure used for transmitting the received communication signal.

As such, the present invention is not limited by the foregoing discussion or by the accompanying illustrations. For example, at least some of the examples given herein specifically relate to two-stream MIMO transmission/reception. However, the teachings herein are readily applied to more than 2-stream MIMO, and are applicable to other MIMO users. Broadly, the teachings herein provide numerous advantages and features, including lower computational complexity and/or better reception quality in MIMO and other environments, along with reduced receiver ASIC area and/or reduced DSP MIPS count requirements for impairment correlation estimation. Still further, application of the teachings herein yields increased effective Signal-to-Interference-Ratios (SIRs) after demodulation and increased throughput experienced by the user (due to lower Block Error Rate (BLER) for a given Channel Quality Indication (CQI) value.

With the above in mind, those skilled in the art will appreciate that the present invention is limited only by the following claims and their legal equivalents.

What is claimed is:

1. A method of estimating impairment correlations in a receiver comprising:
  representing a plurality of impairment contributors in a generalized expression for impairment correlations;
  identifying which fitting parameters in a parametric model of impairment correlations having individual fitting parameters corresponding to the plurality of impairment contributors are of interest in estimating impairment correlations for a received communication signal by determining which impairment contributors are non-negligible based on direct or indirect knowledge of a transmit signal structure used in transmission of the received communication signal; and
  estimating impairment correlations for the received communication signal based on the identified impairment contributors.

2. The method of claim 1, wherein determining which impairment contributors are non-negligible based on direct or indirect knowledge of the transmit signal structure used in transmission of the received communication signal comprises one of identifying which impairment contributors to consider in estimating impairment correlations for the received communication signal based on received control information, or identifying which impairment contributors to consider in estimating impairment correlations for the received communication signal based on impairment correlation measurements made at the receiver.

3. The method of claim 2, wherein identifying which impairment contributors to consider based on received control information comprises receiving control information that directly or indirectly indicates which impairment contributors should be considered by the receiver in estimating impairment correlations for the received communication signal.

4. The method of claim 2, wherein identifying which impairment contributors to consider based on impairment correlation measurements made at the receiver comprises measuring impairment correlations for a pilot signal received in conjunction with the received communication signal, and determining non-negligible ones of the impairment contributors based on the measured impairment correlations.

5. The method of claim 4, wherein determining non-negligible ones of the impairment contributors based on the measured impairment correlations comprises fitting the parametric model of impairment correlations to the measured impairment correlations based on calculating values for the fitting parameters of the parametric model, and observing relative or absolute values of the fitting parameters to identify non-negligible ones of the impairment contributors.

6. The method of claim 1, wherein estimating impairment correlations for the received communication signal based on the identified impairment contributors comprises calculating an overall impairment correlation estimate for the received communication signal in a first time interval as a function of the identified impairment contributors.

7. The method of claim 6, further comprising at least one of suppressing interference in the received communication signal based on the overall impairment correlation estimate, or estimating signal quality for the received communication signal based on the overall impairment correlation estimate.

8. The method of claim 6, wherein determining which impairment contributors are non-negligible based on direct or indirect knowledge of a transmit signal structure used in transmission of the received communication signal comprises performing background impairment correlation calculations over a second time interval longer than the first time interval, to identify non-negligible ones of the impairment contributors for consideration in the overall impairment correlation estimate.

9. The method of claim 1, wherein representing a plurality of impairment contributors in a generalized expression for impairment correlations comprises representing the plurality of impairment contributors in the parametric model of impairment correlations.

10. The method of claim 9, wherein determining which impairment contributors are non-negligible based on direct or indirect knowledge of a transmit signal structure used in transmission of the received communication signal comprises observing relative or absolute fitting parameter values corresponding to the plurality of impairment contributors represented in the parametric model, to identify non-negligible ones of the impairment contributors.

11. The method of claim 9, wherein determining which impairment contributors are non-negligible based on direct or indirect knowledge of a transmit signal structure used in transmission of the received communication signal comprises performing model fitting calculations using measured impairment correlations as part of background processing at the receiver, and observing the relative or absolute values of the resultant model fitting parameters over time, to identify non-negligible ones of the impairment contributors.

12. The method of claim 11, wherein estimating impairment correlations for the received communication signal based on the identified impairment contributors comprises, for a current foreground processing interval at the receiver, generating an overall estimate of impairment correlations for the received communication signal by fitting parametric model terms corresponding to the non-negligible ones of the impairment contributors to measured impairment correlations.

13. The method of claim 1, wherein the receiver comprises a Multiple-Input-Multiple-Output (MIMO) receiver and the received communication signal comprises a MIMO communication signal.

14. The method of claim 13, wherein determining which impairment contributors are non-negligible based on direct or indirect knowledge of a transmit signal structure used in transmission of the received communication signal comprises determining one or more MIMO transmission parameters for the received communication signal that determine which impairment contributors should be considered in estimating impairment correlations for the received communication signal.

15. The method of claim 1, further comprising acquiring direct knowledge of the transmit signal structure based on received information.

16. The method of claim 1, further comprising acquiring indirect knowledge of the transmit signal structure by calculating values for some or all of the fitting parameters in the parametric model of impairment correlations, and evaluating their relative or absolute values over one or more evaluation intervals.

17. The method of claim 1, wherein determining which impairment contributors are non-negligible based on direct or indirect knowledge of a transmit signal structure used in transmission of the received communication signal comprises, for the case where the transmit signal structure comprises transmitting to one scheduled user at a time, determining that fitting parameters corresponding to other users are not of interest.

18. The method of claim 1, further comprising, for the case where the transmit signal structure comprises transmitting multiple information streams with equal power, determining that fitting parameters corresponding to the equal-power information streams are like-valued, and using commonly estimated fitting parameter values for the equal-power information streams.

19. The method of claim 1, wherein identifying the fitting parameters that are of interest comprises selecting particular fitting parameters, or particular groups of fitting parameters, from among the plurality of fitting parameters in the parametric model of impairment correlations based on knowledge of the transmit signal structure used for transmitting the received communication signal.

20. A receiver circuit for estimating impairment correlations in a receiver comprising one or more processing circuits configured to:
represent a plurality of impairment contributors in a generalized expression for impairment correlations;
identify which fitting parameters in a parametric model of impairment correlations having individual fitting parameters corresponding to the plurality of impairment contributors are of interest in estimating impairment correlations for a received communication signal by determining which impairment contributors are non-negligible based on direct or indirect knowledge of a transmit signal structure used in transmission of the received communication signal; and estimate impairment correlations for the received communication signal based on the identified impairment contributors.

21. The receiver circuit of claim 20, wherein the one or more processing circuits are configured to determine which impairment contributors are non-negligible based on control information received at the receiver, or based on impairment correlation measurements made at the receiver.

22. The receiver circuit of claim 21, wherein the one or more processing circuits are configured to receive control information that directly or indirectly indicates which impairment contributors in the generalized expression to consider in estimating impairment correlations for the received communication signal.

23. The receiver circuit of claim 21, wherein the one or more processing circuits are configured to measure impairment correlations for a pilot signal received in conjunction with the received communication signal, and to identify which impairment contributors in the generalized expression to consider in estimating impairment correlations for the received communication signal by identifying non-negligible ones of the impairment contributors based on the measured impairment correlations.

24. The receiver circuit of claim 23, wherein the one or more processing circuits are configured to identify non-negligible ones of the impairment contributors based on the measured impairment correlations by fitting the parametric model of impairment correlations to the measured impairment correlations based on calculating values for the plurality of fitting parameters and observing relative or absolute values of the fitting parameters.

25. The receiver circuit of claim 20, wherein the one or more processing circuits are configured to estimate impairment correlations for the received communication signal based on the identified impairment contributors by calculating an overall impairment correlation estimate for the received communication signal in a first time interval as a function of the identified impairment contributors.

26. The receiver circuit of claim 25, wherein the one or more processing circuits are configured to provide the overall impairment correlation estimate for interference suppression or signal quality determination for the received communication signal.

27. The receiver circuit of claim 25, wherein the one or more processing circuits are configured to determine which impairment contributors are non-negligible by performing background impairment correlation calculations over a second time interval longer than the first time interval, to identify non-negligible ones of the impairment contributors.

28. The receiver circuit of claim 20, wherein the one or more processing circuits are configured to represent the generalized expression for impairment correlations as the parametric model of impairment correlations.

29. The receiver circuit of claim 28, wherein the one or more processing circuits are configured to determine which impairment contributors are non-negligible by identifying non-negligible ones in the plurality of impairment contributors based on performing parametric model fitting calculations using measured impairment correlations as part of background processing at the receiver and observing the relative or absolute values of the resultant model fitting parameters over one or more background processing intervals.

30. The receiver circuit of claim 29, wherein the one or more processing circuits are configured to estimate impairment correlations for the received communication signal based on the identified impairment contributors by, for a current foreground processing interval at the receiver, generating an overall estimate of impairment correlations for the received communication signal based on fitting parametric model terms corresponding to the non-negligible ones of the impairment contributors to measured impairment correlations.

31. The receiver circuit of claim 20, wherein the receiver comprises a Multiple-Input-Multiple-Output (MIMO) receiver and the received communication signal comprises a MIMO communication signal.

32. The receiver circuit of claim 31, wherein the one or more processing circuits are configured to determine which impairment contributors are non-negligible by determining one or more MIMO transmission parameters for the received communication signal that determine which impairment contributors in the generalized expression should be considered by the receiver in estimating impairment correlations for the received signal.

33. The receiver circuit of claim 20, wherein the one or more processing circuit comprise a determination circuit configured to determine which impairment contributors are non-negligible, and an estimation circuit configured to estimate overall impairment correlations for the received communication signal based on the identified impairment contributors.

34. The receiver circuit of claim 33, further comprising a combining weight generator configured to generate combining weights for the received communication signal based on the estimate of overall impairment correlations.

35. The receiver circuit of claim 20, wherein the one or more processing circuits are configured to acquire direct knowledge of the transmit signal structure based on received information.

36. The receiver circuit of claim 20, wherein the one or more processing circuits are configured to acquire indirect knowledge of the transmit signal structure by calculating values for some or all of the fitting parameters in the parametric model of impairment correlations, and evaluating their relative or absolute values over one or more evaluation intervals.

37. The receiver circuit of claim 20, wherein the one or more processing circuits are configured to determine which impairment contributors are non-negligible based on direct or indirect knowledge of a transmit signal structure used in transmission of the received communication signal by, for the case where the transmit signal structure comprises transmitting to one scheduled user at a time, determining that fitting parameters corresponding to other users are not of interest.

38. The receiver circuit of claim 20, wherein, for the case where the transmit signal structure comprises transmitting multiple information streams with equal power, the one or more processing circuits are configured to determine that fitting parameters corresponding to the equal-power information streams are like-valued, and using commonly estimated fitting parameter values for the equal-power information streams.

39. The receiver circuit of claim 20, wherein the one or more processing circuits are configured to identify the fitting parameters that are of interest by selecting particular fitting parameters, or particular groups of fitting parameters, from among the plurality of fitting parameters in the parametric model of impairment correlations based on knowledge of the transmit signal structure used for transmitting the received communication signal.

40. A method of estimating impairment correlations in a receiver for a received communication signal, the method comprising:
representing a plurality of impairment contributors in a generalized expression comprising a parametric model having model fitting parameters corresponding to plurality impairment contributors;

dynamically identifying which impairment contributors in the plurality of impairment contributors that are of interest based on inferred or direct knowledge of interference conditions by calculating the model fitting parameters individually or in related subgroups over one or more background processing intervals, based on fitting corresponding model terms in the parametric model to measured impairment correlations and observing the model fitting parameters over the one or more background processing intervals to identify non-negligible ones of the impairment contributors; and estimating impairment correlations for the received communication signal by fitting model terms in the parametric model corresponding to the impairment contributors that are of interest to currently measured impairment correlations.

41. The method of claim 40, further comprising acquiring direct knowledge of interference conditions based on receiving information relating to a transmit signal structure bearing on the interference conditions.

42. The method of claim 40, further comprising acquiring inferred knowledge of interference conditions by evaluating calculated values for some or all of the fitting parameters in the parametric model over one or more evaluation intervals.

43. The method of claim 40, further comprising, from among the fitting parameters corresponding to the impairment contributors that are of interest, identifying one or more groups of like-valued fitting parameters, and estimating such like-valued fitting parameters together.

44. The method of claim 40, wherein estimating impairment correlations for the received communication signal by fitting model terms in the parametric model corresponding to the impairment contributors that are of interest comprises, in a given foreground processing interval, fitting model terms in the parametric model corresponding to the non-negligible impairment contributors to current impairment correlations measurements made for a pilot signal received in conjunction with the received communication signal.

45. The method of claim 40, wherein the received communication signal is a Multiple-Input-Multiple-Output (MIMO) communication signal, and wherein the receiver is a MIMO receiver.

\* \* \* \* \*

UNITED STATES PATENT AND TRADEMARK OFFICE
CERTIFICATE OF CORRECTION

PATENT NO. : 7,949,063 B2  
APPLICATION NO. : 11/679541  
DATED : May 24, 2011  
INVENTOR(S) : Jonsson et al.

It is certified that error appears in the above-identified patent and that said Letters Patent is hereby corrected as shown below:

Title Page, Item (56), under "OTHER PUBLICATIONS", in Column 2, Line 4, delete "Ricean" and insert -- Rician --, therefor.

In Column 7, Line 40, in Equation (3), delete "$(v^{(1,1)}{}_h CPICH,1 + v^{(1,2)}{}_h CPICH,2)$" and insert -- $\left(v^{(1,1)}{}_\mathbf{h} CPICH,1 + v^{(1,2)}{}_\mathbf{h} CPICH,2\right)$ --, therefor.

In Column 7, Line 43, in Equation (4), delete "$(v^{(1,1)}{}_h CPICH,1 + v^{(1,2)}{}_h CPICH,2)$" and insert -- $\left(v^{(1,1)}{}_\mathbf{h} CPICH,1 + v^{(1,2)}{}_\mathbf{h} CPICH,2\right)$ --, therefor.

In Column 8, Line 9, Equation (5), delete "$f_1 \, f_2$ and insert -- $f_1, f_2$ --, therefor.

In Column 8, Line 53, Equation (6), delete "$f_1 \, f_2$ and insert -- $f_1, f_2$ --, therefor.

In Column 8, Line 63, Equation (6), delete "$\left(h_{l_1}^{prop,m R_{x_1}}\right)$" and insert -- $\left(h_{l_1}^{prop,1,m R_{x_1}}\right)$ --, therefor.

In Column 14, Line 16, delete "the the" and insert -- the --, therefor.

Signed and Sealed this  
Twenty-second Day of November, 2011

David J. Kappos  
*Director of the United States Patent and Trademark Office*